United States Patent Office 3,312,661
Patented Apr. 4, 1967

3,312,661
PROCESS FOR PREPARING POLYCARBONATES BY SELF-CONDENSATION OF BISPHENOL DI-CHLOROFORMATE
Raymond P. Kurkjy, Geneva, Switzerland, and Markus Matzner, Edison Township, and Robert J. Cotter, New Brunswick, N.J., assignors to Union Carbide Corporation, a corporation of New York
No Drawing. Filed July 3, 1962, Ser. No. 208,674
11 Claims. (Cl. 260—47)

The present invention relates in general to a novel process for preparing polycarbonate resins, and more particularly to an anhydrous process for preparing polycarbonates from aryl dichloroformates using metal oxide reagents.

It has formely been proposed to prepare polycarbonates by several techniques, most if not all of which can be categorized as being either ester interchange or direct phosgenation. According to the ester-interchange method a suitable diester of carbonic acid is contacted with a dihydric phenol at elevated temperatures sufficient to promote a condensation reaction and thereby form a polycarbonate chain. The direct phosgenation method comprises an interfacial reaction between phosgene and an alkali metal salt of a dihydric phenol in a two-phase reaction system having an inert organic solvent medium for one phase and an aqueous medium for the other phase.

Each of the above-mentioned general processes has one or more disadvantages which would be desirably avoided, particularly where large scale commercial operations are involved. For example in the later polymerization stages of the ester-interchange process, the reaction system becomes extremely viscous, thereby giving rise to problems of agitation or stirring and to problems associated with the removal from the reaction system of the reaction by-products. Also, because of the relatively high reaction temperatures involved, some molecular rearrangement is incurred which to some degree destroys the complete linearity of the polycarbonate product.

By the interfacial direct phosgenation method it has been found that a few but quite interesting dihydric phenols are polymerized to form polycarbonates only with considerable difficulty. Moreover, because of the strongly alkaline nature of the reaction system, chain cleavage of some polymer chains already formed occurs, rendering reproducibility difficult to obtain without particular effort being made to control the pH of the reaction system.

It is therefore the general object of the present invention to provide a novel anhydrous process for preparing polycarbonate resins which avoids the disadvantages of the prior known methods.

It is a more particular object of the present invention to provide a process for preparing polycarbonates in excellent yield, good color, and reproducibly high molecular weight.

These and other and more particular objects which will be obvious from the specification hereinafter are accomplished by the process of the present invention which comprises heating at elevated temperatures an anhydrous reaction system comprising a bisphenol dichloroformate and a metal oxide of a metal of Groups I-B, II-A, and II-B of the Deming periodic classification of elements.

The aryl dichloroformates suitably employed in the process of this invention have the general formula:

(I) 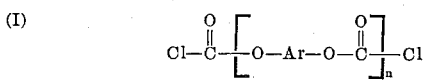

wherein $n$ is an integer having a value of from 1 to about 15 and Ar represents the aromatic hydrocarbon residue of a dihydric phenol, i.e., the divalent moiety which remains after schematically splitting off both hydroxyl groups from a dihydric phenol free of groups reactive in the system herein employed such as amine and carboxyl, and sulphydryl.

The dichloroformates of any of the dihydric phenols heretofore employed in any of the prior known polycarbonate processes are suitable for use in this invention. Such dichloroformates are usually defined as being mononuclear or polynuclear compounds in which the two

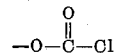

groups are directly attached to different carbon atoms of the same or different aromatic nuclei. The class of suitable aryl dichloroformates is quite large and includes the dichloroformate derivatives of the phenol compounds described in U.S. Patent 2,950,266—Goldblum and U.S. Patent 2,964,797—Peilstöcker et al. corresponding to the general formula:

(II) 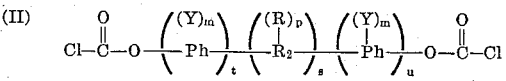

wherein the radical

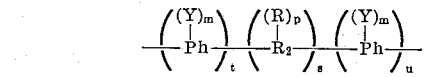

is equivalent to —Ar— in Formula I above and wherein R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents therein, such as halogen (chlorine, bromine, fluorine, etc.). It will be understood that where more than one R is used, they may be the same or different. $R_2$ is selected from the group consisting of an alkylene and alkylidene residue such as methylene, ethylene, propylene, propylidene, isopropylidene, butylene, butylidene, amylene, isoamylene, isomalyidene, cyclohexylidene, etc. $R_2$ can also be a silane radical or can be a polyoxy such as polyethoxy, polypropoxy, polythioethoxy, polybutoxy, polyphenylethoxy or polyorganosiloxy, for example, polydimethylsiloxy, polydiphenylsiloxy, polymethylphenylsiloxy, etc., or an ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. Ph is the residue of an aromatic nucleus, Y is an substituent selected from the group consisting of (a) inorganic atoms, (b) inorganic radicals, and (c) organic radicals, (a), (b), and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers including zero. When $s$ is zero, however, either $t$ or $u$ may be zero and not both.

In the dichloroformate compound, the substituent Y may be the same or different, as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where $s$ is zero in Formula II, the aromatic nuclei are directly joined with no intervening alkylene or alkylidene or other bridge. The positions of the hydroxyl groups and Y on the aromatic nuclear residues Ph can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenyl compounds that may be employed in this invention include 2,2-bis-(4-hydroxyphenyl)-propane (bisphenol - A); 2,4'-dihydroxydiphenyl-methane; bis-(2-hydroxyphenyl)-methane; bis-(4-hydroxyphenyl) - methane; bis-(4 - hydroxy-5-nitrophenyl)-methane; bis-(4-hydroxy-2,6-dimethyl - 3 - methoxyphenyl)-methane, 1,1-bis-(4-hydroxyphenyl)-ethane; 1,2-bis-(4-hydroxyphenyl) ethane; 1,1-bis-(4-hydroxy-2-chlorophenyl)-ethane; 1,1-bis-(2,5-dimethyl-4-hydroxyphenyl) - ethane; 1,3-bis-(3-methyl-4-hydroxyphenyl)-propane; 2,2-bis-(3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)-pentane; 3,3-bis - (4 - hydroxyphenyl) - pentane; 2,2-bis-(4-hydroxyphenyl) - heptane; bis-(4-hydroxyphenyl)-phenyl methane; bis-(4-hydroxyphenyl)-cyclohexyl methane; 1,2-bis-(4-hydroxyphenyl)- 1,2-(phenyl)ethane; 2-bis-(4 - hydroxyphenyl) - 1,3 - bis-(phenyl) propane; 2,2-bis-(4-hydroxyphenyl)-1-phenyl propane; and the like. Also included are dihydroxybenzenes typified by hydroquinone and resorcinol, dihydroxyphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones such as bis-(p-hydroxyphenyl)-sulfone; 2,4'-dihydroxydiphenyl sulfone; 5'-chloro - 2,4'-dihydroxydiphenyl sulfone; 5'-chloro-2'-4-dihydroxydiphenyl sulfone; 5'-chloro-2',4'-dihydroxydiphenyl sulfone; 3'-chloro-4,4'-dihydroxydiphenyl sulfone; bis-(4-hydroxy phenyl) biphenyl disulfone, etc. The preparation of these and other useful sulfones is described in U.S. Patent 2,288,282—Huissman. Polysulfones as well as substituted sulfones using halogen, nitrogen alkyl radicals, etc. are also useful. Dihydroxy aromatic ethers such as p,p'-dihydroxydiphenyl ether; the 4,3'-, 4,2'-, 3,3'-, 2,2'-, 2,3'-, etc. dihydroxydiphenyl ethers; 4,4'-dihydroxy-2,6-dimethyldiphenyl ether; 4,4'-dihydroxy-2,5-dimethyldiphenyl ether; 4,4'-dihydroxy-3,3' - diisobutyldiphenyl ether; 4,4' - dihydroxy-3,3'-diisopropyldiphenyl ether; 4,4'-dihydroxy-3,2'-dinitrodiphenyl ether; 4,4' - dihydroxy-3,3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4-dihydroxytetraphenyl ether; 2,4-dihydroxytetraphenyl ether; 4,4' - dihydroxypentaphenyl ether; 4,4'-dihydroxy-2,6-dimethoxyphenyl ether; 4,4'-dihydroxy-2,5-diethoxydiphenyl ether, etc.

Mixtures of the aforesaid aryl dichloroformates can be used, and where $n$ in Formula I above is greater than 1, the Ar moiety need not be the same in each repeating unit. Preferably the dichloroformates are those wherein Ar is the divalent residue of gem-bis-(hydroxyphenyl) alkane in which the central alkylidene radical contains from 1 to 6 carbon atoms. Most particularly preferred is 2,2-bis (4-hydroxyphenyl)propane.

The aryl dichloroformates represented by Formula II above can readily be prepared by phosgenation of the corresponding dihydric phenols according to the method described in detail in our copending application Ser. No. 208,673 filed on the same date as the present application and since issued as U.S. Patent 3,255,230.

Those aryl dichloroformates corresponding to Formula I wherein $n$ has a value of 2 or greater can be prepared by rapidly adding, preferably as a liquid, phosgene to an aqueous solution of the dialkali metal salt of a dihydric phenol which contains a buffer such as sodium carbonate to establish a reaction system having a pH of not more than 12 and preferably from 9–11. The reaction system can also contain an inert organic diluent such as methylene chloride. Exemplary of this procedure is the disclosure of British Patent 878,115, published September 27, 1961.

The metal oxide reagents suitably employed are the oxides of metals constituting those classified as Groups I–B, II–A, and II–B of the Periodic System of Elements according to Deming (Handbook of Chemistry and Physics, page 312, 30th ed. (1947), Chemical Rubber Publishing Co., Cleveland, Ohio) in which the metal is in its highest oxidation state. The metals of these three groups of greatest practical value due to their ready availability are copper, silver, gold, beryllium, magnesium, calcium, strontium, barium, zinc, cadmium, and mercury. The corresponding oxides which are employed as reagents in the present process are $CuO$, $Ag_2O$, $Au_2O_3$, $CdO$, $HgO$, $BeO$, $MgO$, $CaO$, $SrO$, and $BaO$. The oxides of metals of Groups II–A, and especially magnesium oxide are preferred.

The proportion of metal oxide reagent relative to the aryl dichloroformate in the reaction mixture is not a narrowly critical factor. Although we do not wish to be bound by any particular theory or reaction mechanism, it is believed that the reaction proceeds according to the following general equation in which Ar has the same meaning as in Formula I and Met represents a metal ion:

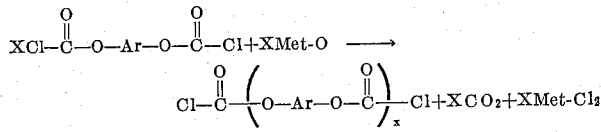

for a theoretically complete reaction, therefore, the stoichiometric quantity of metal oxide is one mole for each mole or aryl dichloroformate present. It will be obvious to those skilled in the art however that even large excesses of either reagent will not destroy the fundamental reaction.

The reaction can be accomplished either in bulk, preferably with the aryl dichloroformate in the molten state, or in an inert organic solvent medium. Suitable solvents serving as reaction media are advantageously the higher boiling halogenated hydrocarbons such as chlorobenzene, dichlorobenzene, sym. tetrachloroethane, carbon tetrachloride, but other conventional solvents such as chloroform, benzene, toluene, xylenes and the like can also be used.

Reaction temperatures are not critical, but optimum temperatures will vary depending primarily upon the particular aryl dichloroformate employed. In bulk reaction systems, temperatures within the range of from about 90° C. to about 220° C. have been found to be generally suitable. In reactions carried out in an inert organic solvent medium, the reflux temperature is determinative of the reaction temperature at atmospheric pressure. Solvents boiling at about 110° C. to about 200° C. are preferred.

By employing mixtures of aryl dichloroformates, copolymers are prepared with equal facility as the homopolymers.

The present invention is more fully illustrated by the following examples. It is to be understood that these examples are in no way intended to be limitative of the proper scope of the invention which is defined in the appended claims.

EXAMPLE 1

*Preparation of the dichloroformate of 2,2-bis(4-hydroxyphenyl)propane.*—In a glass reactor equipped with stirring means and a condenser system permitting the egress of HCl only from the reactor, a solution of 20 grams (0.1 mole) of 2,2-bis(4-hydroxyphenyl)propane, 0.05 mole distearyldimethylammonium chloride, and 250 ml. carbon tetrachloride is admixed with 19.8 grams phosgene at 0° C. The resulting mixture is then heated with stirring at such a rate as to maintain a steady reflux of phosgene. The reaction is maintained for a period of about 4 hours at a temperature of 76° C. At the end of this period, the evolution of HCl will have essentially ceased. The product dichloroformate is isolated by filtration of the cooled reaction product followed by evaporation of the resulting filtrate. The product has a melting point of 90–91° C.

EXAMPLE 2

In a glass reactor equipped with stirrer, thermometer, and reflux condenser, a mixture of 3 grams (0.0085 mole) of the dichloroformate of 2,2-bis(4-hydroxyphenyl)propane, 0.35 gram (0.0085 mole) of magnesium oxide, and 15 ml. of o-dichlorobenzene was heated at the reflux temperature of o-dichlorobenzene for 24 hours. During the heating period carbon dioxide was evolved from the reaction system. Some discoloration of the inorganic precipitate was noted but the liquid layer remained colorless throughout the reaction period. After cooling to room temperature the reaction mass was filtered to remove inorganic solids and the polycarbonate in the filtrate coagulated in about 150 ml. isopropanol. A 55 percent yield of a white polycarbonate having a reduced viscosity (0.2 g. per 100 ml. $CH_2Cl_2$ at 25° C.) of 0.14 was obtained.

EXAMPLE 3

A mixture of 2.5 grams (0.007 mole) of the dichloroformate of 2,2-bis(4-hydroxyphenyl)propane, 2.1 grams magnesium oxide, and 5 ml. of o-dichlorobenzene was heated in an oil bath at 188° C. for 3 hours. During the heating period carbon dioxide was rapidly evolved. No color developed. After cooling, about 50 ml. of methylene chloride was added to the reaction mass to accomplish complete solution of the polymeric content, and the solution filtered through a celite bed prepared in chlorobenzene. The colorless filtrate was coagulated in approximately 10 times its volume of isopropanol. A white polycarbonate homopolymer of bisphenol-A was obtained in a yield of 70 percent and had a reduced viscosity value of 0.71 (0.2 g. polymer 100 ml. $CH_2Cl_2$ solution). The polymer possessed physical properties identical with a polycarbonate of comparable reduced viscosity prepared by the prior known interfacial direct phosgenation.

EXAMPLES 4–8

Using substantially the same apparatus and procedure as set forth in Example 2, a variety of polycarbonate homopolymers and copolymers are produced using a variety of metal oxides and solvent media. The reaction formulations are set forth in Table I below. In all examples equimolar amounts of metal oxide and dichloroformate are employed.

| Ex. No. | $Ar-(-O-\overset{O}{\underset{\|}{C}}-Cl)_2$ in which Ar is— | Metal Oxide | Solvent | Polymer Product | Reaction Temp., ° C. |
|---|---|---|---|---|---|
| 4 | —⟨⟩—$\overset{O_2}{\underset{\|}{S}}$—⟨⟩— | CuO | Carbon tetrachloride. | $Cl-\overset{O}{\underset{\|}{C}}$—[—O—⟨⟩—$\overset{O_2}{\underset{\|}{S}}$—⟨⟩—O—$\overset{O}{\underset{\|}{C}}$—]$_n$—Cl, n=>60 | 76 |
| 5 | —⟨⟩—$\overset{H}{\underset{H}{C}}$—⟨⟩— | CdO | Chlorobenzene | $Cl-\overset{O}{\underset{\|}{C}}$—[—O—⟨⟩—$\overset{H}{\underset{H}{C}}$—⟨⟩—O—$\overset{O}{\underset{\|}{C}}$—]$_n$—Cl, n=>23 | ~130 |
| 6 | —⟨Cl⟩—$\overset{CH_3}{\underset{CH_3}{C}}$—⟨Cl⟩— | BeO | Tetrachloroethane. | $Cl-\overset{O}{\underset{\|}{C}}$—[—O—⟨Cl⟩—$\overset{CH_3}{\underset{CH_3}{C}}$—⟨Cl⟩—O—$\overset{O}{\underset{\|}{C}}$—]$_n$—Cl, n=>40 | ~144 |
| 7 | —⟨$C_2H_5$, $C_2H_5$⟩—$\overset{H}{\underset{\underset{S}{\underset{\|}{⟨⟩}}}{C}}$—⟨$C_2H_5$, $C_2H_5$⟩— | SrO | Chlorobenzene | $Cl-\overset{O}{\underset{\|}{C}}$—[—O—⟨$C_2H_5$⟩—$\overset{H}{\underset{\underset{S}{\underset{\|}{⟨⟩}}}{C}}$—⟨$C_2H$, $C_2H_5$⟩—O—$\overset{O}{\underset{\|}{C}}$—]$_n$—Cl, n=>25 | ~130 |
| 8 | ⟨⟩⟨⟩—$\overset{CH_2}{\underset{\underset{CH_3}{CH_2}}{C}}$—⟨⟩⟨⟩ | HgO | Dichlorobenzene | $Cl-\overset{O}{\underset{\|}{C}}$—[—⟨⟩⟨⟩—$\overset{CH_3}{\underset{\underset{CH_3}{CH_2}}{C}}$—⟨⟩⟨⟩—O—$\overset{O}{\underset{\|}{C}}$—]$_n$—Cl, n=>50 | ~180 |

EXAMPLE 9

Using substantially the same apparatus and procedure as set forth in Example 2 a copolymer corresponding to the structure

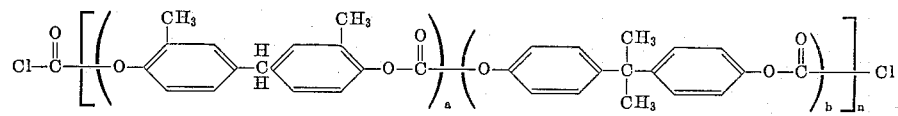

in which $$\frac{a}{(a+b)}$$

has a value of about 0.5 is prepared by heating at reflux temperature 1 mole of a substantially equimolar mixture of the dichloroformate of 2,2-bis(4-hydroxyphenyl)propane and the dichloroformate of 2,2-bis(3-methyl-4-hydroxyphenyl)methane with 1.2 moles of CdO in a 1,1,2-trichloroethane solvent medium at the reflux temperature of the solvent.

EXAMPLE 10

(A) An aryl dichloroformate having an average structure corresponding to

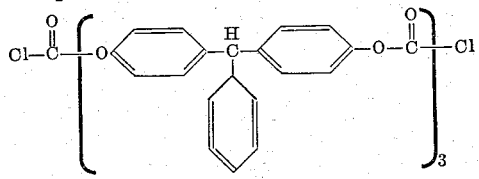

is prepared by charging to a glass reactor equipped with a stirrer 1.2 moles sodium hydroxide, 0.6 mole 2,2-bis(4-hydroxyphenyl)-phenylmethane, 0.9 mole sodium carbonate, 1000 ml. $H_2O$, and 500 ml. methylene chloride. The resulting mixture is cooled to 0° C. and maintained at this temperature, a solution of 1.25 moles phosgene in 100 ml. methylene chloride is added over a period of five minutes. The reaction mixture is stirred while the temperature is permitted to increase slowly to 25° C. The reaction medium is washed with dilute sulphuric acid, the organic layer removed, and dried over magnesium sulfate. After complete removal of residual sulfuric acid the resulting solution is evaporated, the chloroformate terminated prepolymer dissolved in 500 ml. chlorobenzene, and the solution is thereafter contacted with an equimolar quantity of $Ag_2O$ and refluxed for 24 hours. The resulting polymer product is a normally solid high molecular weight polymer having a reduced viscosity value (0.2 g. polymer/100 ml. $CH_2Cl_2$ solution at 25° C.) of greater than about 0.5.

(B) A high molecular weight polymer substantially the same as prepared in part (A) above is produced when the same prepolymer is contacted with BaO in the proportions and according to the procedure of part (A).

What is claimed is:
1. The process for preparing polycarbonate resins which comprises self-condensing at elevated temperatures in the absence of water an aryl chloroformate in the presence of about a stoichiometric quantity of a metal oxide as the sole reactive materials in the reaction, said aryl chloroformate having the formula

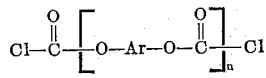

wherein Ar represents a divalent aromatic hydrocarbon radical and $n$ has a value of from 1 to about 15, said metal oxide being of a metal selected from Groups I–B, II–A, and II–B of the Deming periodic classification of elements, said metal being in its highest oxidation state.

2. The process according to claim 1 wherein Ar has the formula

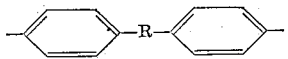

and wherein R represents a divalent alkylidene group in which both phenylene groups are attached to the same carbon atom of the central alkylidene group.

3. The process according to claim 2 wherein R has the formula

4. The process according to claim 2 wherein $n$ has a value of 1.
5. The process according to claim 2 wherein the metal oxide is the oxide of Group II–A of the Deming Periodic System of Elements.
6. The process according to claim 5 wherein the metal oxide is MgO.
7. The process according to claim 5 wherein the metal oxide is CaO.
8. The process according to claim 5 wherein the metal oxide is SrO.
9. The process according to claim 5 wherein the metal oxide is BaO.
10. The process according to claim 1 wherein substantially equal molar quantities of aryl dichloroformate and metal oxide are heated in contact with each other in an inert organic solvent medium.
11. The process according to claim 10 wherein the inert organic solvent is o-dichlorobenzene.

References Cited by the Examiner

UNITED STATES PATENTS

| | | | |
|---|---|---|---|
| 2,964,797 | 12/1960 | Peilstocker et al. | 260—47 |
| 3,030,331 | 4/1962 | Goldberg | 260—47 |
| 3,030,335 | 4/1962 | Goldberg | 260—47 |
| 3,161,615 | 12/1964 | Goldberg | 260—47 X |
| 3,189,640 | 6/1965 | Dietrich et al. | 260—463 |
| 3,213,061 | 10/1965 | Caldwell et al. | 260—47 X |
| 3,220,976 | 11/1965 | Goldberg | 260—47 |
| 3,223,677 | 12/1965 | Matzner | 260—47 |

FOREIGN PATENTS

| | | |
|---|---|---|
| 870,096 | 6/1961 | Great Britain. |
| 1,198,715 | 6/1959 | France. |

WILLIAM H. SHORT, *Primary Examiner.*

LOUISE P. QUAST, *Examiner.*